June 12, 1962   R. C. KOCH ET AL   3,038,515
LAMINATED ARTICLE
Filed Oct. 1, 1956
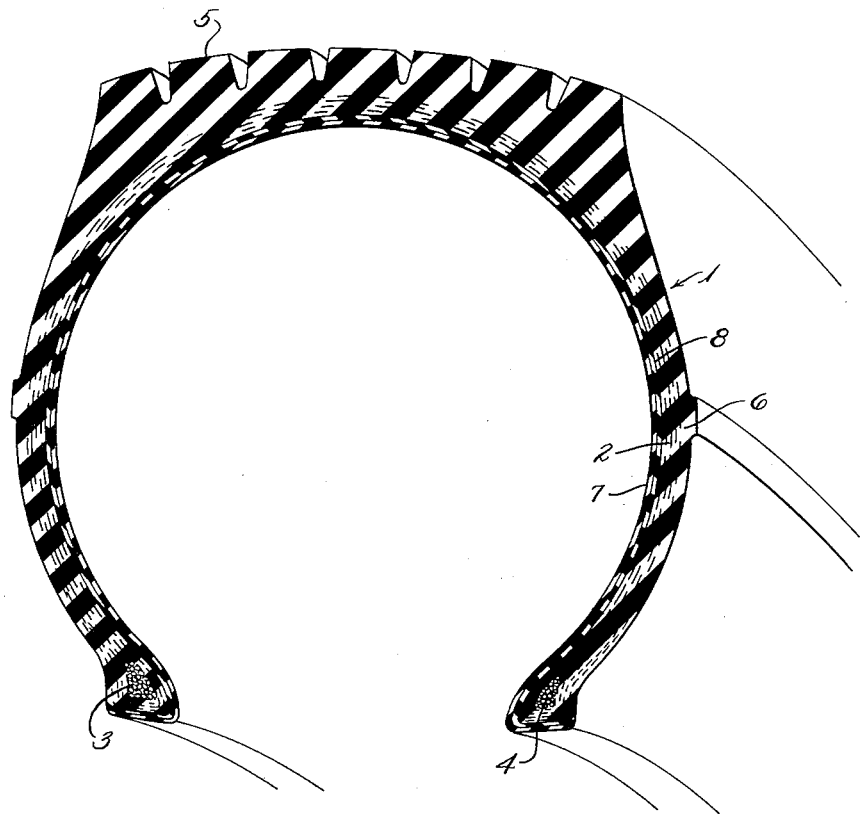
INVENTORS
WALTER C. ROLLE
BY ROBERT C. KOCH
W. A. Fraser
ATTY.

United States Patent Office 3,038,515
Patented June 12, 1962

3,038,515
LAMINATED ARTICLE
Robert Charles Koch and Walter C. Rowe, Akron, Ohio, assignors to The Firestone Tire & Rubber Company, Akron, Ohio, a corporation of Ohio
Filed Oct. 1, 1956, Ser. No. 613,092
3 Claims. (Cl. 152—330)

This invention relates to improved adhesive bonds in vulcanized structures comprised of layers of rubbery copolymers of butadiene and styrene and rubbery layers formed of copolymers of a major portion of an isoolefin and a minor portion of an open chain conjugated diolefin. More particularly, the invention relates to an improved vulcanized bond between layers of the so-called GRS polymers and layers of butyl-type rubber.

The adhesion of the butyl-type polymers to copolymers of butadiene and styrene is poor for the reason that during the vulcanization reaction, the GRS polymers have much greater unsaturation than the butyl-type rubber "hog" the vulcanizing agent such as sulfur with the result that the butyl-type rubber does not vulcanize satisfactory. This difficulty has resulted in poor vulcanized adhesion between layers of GRS polymer vulcanized to layers of butyl-type rubber in laminated articles.

The present invention overcomes the difficulties of the prior art in adhering GRS to butyl-type rubber by the addition of silica oxide to one of the rubbery components of the laminate and the chlorination of the butyl-type rubber portion of the laminate before the article is vulcanized.

It is therefore an object of the invention to improve the vulcanized bond between layers formed from copolymers of butadiene and styrene and layers formed from copolymers of a major portion of an isoolefin having from 4 to 8 carbon atoms and a minor portion of an open chain conjugated diolefin having from 4 to 7 carbon atoms. It is also an object of the invention to improve the adhesion of layers of GRS to layers of butyl-type rubber by incorporating silica in one of the layers and chlorinating the butyl-type rubber. Yet a further object of the invention is to provide a rubbery article comprised of laminated layers of GRS and butyl-type rubber having a good vulcanized bond between layers thereof through the incorporation of silica in the rubbery polymer of one layer and the use of chlorinated butyl rubber in the other layer. These and other objects of the invention will be more fully understood with reference to the specification, claims and the drawing which is a perspective view partially broken away to show the invention as used in a pneumatic tubeless tire.

Rubber of the butyl-type used in the invention may be prepared by the procedure disclosed by Robert M. Thomas and William J. Sparks in U.S. Patent Number 2,356,128 which consists in preparing a mixture of an isoolefin such as isobutylene in the proportion of from 70 to 99 parts with an open chain conjugated diolefin such as butadiene or isoprene in the proportion of 30 to 1 parts. The mixture is then cooled to a relatively low temperature, preferably below −50° C., in the presence of a metal halide catalyst such as aluminum chloride. The polymerization results after further treatment in a rubbery vulcanizable material.

One procedure for chlorinating butyl rubber is disclosed in U.S. Patent Number 2,442,083. In the preferred preparation of chlorinated rubber, the polymer is mixed with a chlorinating material such as "Halane" (manufactured by the Wyandotte Chemical Company) on a two roll mill. Chlorine is thus incorporated in the polymer which then may be compounded with conventional compounding ingredients to produce a rubbery composition having vulcanization characteristics. Another chlorinating agent which may be mixed with butyl rubber on a mill is "Dactin" sold by E. I. du Pont de Nemours & Company. From 3 to 10 parts of Halane to 100 parts of butyl is useful in the invention while 4 to 5 parts is preferred.

The chlorinated butyl was prepared according to the following formula:

COMPOUND I

| | |
|---|---|
| GR–I 50 | 100.0 |
| Halane [1] | 4.0 |
| Stearic acid | 1.0 |

[1] Dichlorodimethyl hydantoin sold by the Wyandotte Chemical Company, Wyandotte, Michigan.

The above formulation was mixed in a Banbury mixer under conditions which yielded a temperature which reached 200° F. in 4½ minutes. The resulting product was sheeted out on a mill for use as will be described.

Although certain chlorinating materials have been set out by way of example, the invention is not limited thereto. The invention resides in using butyl rubber containing at least .8% chlorine based on the weight of butyl rubber hydrocarbon present while ranges of from .8 to 1.5% are extremely useful while about 1% is preferred. The invention is useful with diene type rubbers such as natural rubber, polychloroprene, copolymers of butadiene and styrene and copolymers of butadiene and acrylonitrile.

In the preparation of the GRS polymers used in the invention, butadiene and styrene are brought together under conditions that result in the copolymerization of these two monomers. Although the polymerization of the two monomers generally takes place at a temperature of 122° F., it is also possible to obtain excellent rubbery materials by copolymerizing the monomers at lower temperatures such at 58° F., 41° F., 14° F., 0° F. and −14° F. Such materials are described in an article in Industrial and Engineering Chemistry, May 1948 by McKenzie, Samuels and Sheron. Copolymers formed at these depressed temperatures are generally known as low temperature polymers (LTP) or "cold rubber." Although the invention is satisfactory with all the GRS polymers, LTP is preferred for the best adhesion results.

In practicing the invention, the GRS polymer is masticated on an open two roll mill or in a closed rubber mixer such as a Banbury mixer. Various pigments are added during the mastication of the copolymers according to the following formula, all parts in this and other examples herein being by weight of rubbery copolymers present:

*Example I*

| | Control | Stock A | Stock B |
|---|---|---|---|
| GRS Rubber | 100 | 100 | 100 |
| Carbon Black | 25 | 25 | 25 |
| Silica [1] | | 50 | 20 |
| Zinc Oxide | 3 | 3 | 3 |
| Stearic Acid | 2 | 2 | 2 |
| Cumar MH 2¼ | 10 | 10 | 10 |
| Sulfur | 3 | 3 | 3 |
| Accelerator | 1.2 | 1.2 | 1.2 |
| Dipropylene Glycol | 1.3 | 1.3 | 1.3 |
| | 145.5 | 195.5 | 165.5 |

[1] HiSil, manufactured by Columbia Southern Chemical Company, Pittsburgh, Pennsylvania.

The rubbery compounds according to the above formulation were formed into sheets on a rubber calender and prepared for lamination to the butyl layers as will be described.

In compounding the chlorinated butyl-type rubber portion of the laminated article, the polymer was broken down on a two roll mill and various pigments were incorporated therein according to the following formula:

*Example II*

| | |
|---|---|
| Natural rubber [1] | 20.0 |
| Chlorinated butyl rubber | 80.0 |
| Carbon black | 50.0 |
| Stearic acid | .4 |
| Zinc oxide | 7.0 |
| Oil | 3.0 |
| Retarder | .3 |
| Sulfur | 2.0 |
| Mercaptobenzothiazole | .7 |
| Amberol St 137-X [2] | 10.00 |
| Tetramethyl thiuram disulfide | .35 |
| | 173.75 |

[1] Present to provide building tack.
[2] A modified phenol-type resin manufactured by Rohm and Haas.

The chlorinated butyl rubber compound of Example II was sheeted out on a calender to a thickness of one quarter inch and cut into sheets having a dimension of 6 inches x 9 inches. A sheet of each was superimposed on a sheet of the GRS compound of Example I to form a laminated structure. A strip of holland cloth was placed between the two sheets at the edges thereof to provide two free ends after vulcanization. (The ends are grasped by the testing machine after vulcanization and used to pull the vulcanized sheets apart to measure adhesion.) Each structure was sandwiched between two sheets of unvulcanized rubberized weftless fabric and each was vulcanized in a vulcanizing press at a temperature of 280° F. for 90 minutes, removed from the press and cut into strips 1" wide. The free ends were mounted respectively in the jaws of a Cooey adhesion tester and drawn apart at a rate of 2 inches per minute. Adhesion between the vulcanized sheets is measured in pounds/inch.

Tests show that the combined use of silica in GRS polymer with chlorine in the butyl-type rubber greatly improves the adhesion between the layers. The rate of vulcanization of the GRS portion containing silica oxide is retarded somewhat. This may be corrected by increasing the sulfur and/or accelerator to adjust the rate to that required. Other ingredients which may be added to both the GRS portion and the butyl-type rubber portion include antioxidants, softeners and reinforcing pigments as necessary to obtain desired results without affecting the improved adhesion obtained by the invention.

Adhesion tests were run on the stocks of Example I with the following results:

| | Control | Stock A | Stock B |
|---|---|---|---|
| Silica Content in GRS Layer—Parts by weight based on 100 parts GR-S Chlorinated Butyl Compounds of Example II— | 0 | 20 | 50 |
| Adhesion | 14# | 18# | 27# |

From the above results, it may be noted that the presence of silica in the GRS component of a laminated article greatly improves the adhesion of that component to adjacent chlorinated butyl rubber portions to which it is vulcanized. For best results within the range of the invention, from 20 to 90 parts of silica based on the weight of polymer present is used while from 30 to 60 parts is preferred.

The silica may be added to the butyl rubber portion of the combination as well as to the GRS portion. When silica is added to the butyl-type rubber portion, the steps of mixing the compounds and vulcanizing may be carried out as described with the same improved adhesion. The silica prepared is hydrated $SiO_2$ sold by the Columbia Southern Chemical Company under the trade name of HiSil.

Referring to the drawing, a tubeless pneumatic passenger tire generally indicated at 1 is comprised of a fabric reinforced portion 2 terminating at each edge in inextensible beads 3 and 4. Superimposed on fabric portion 2 is a tread portion 5 and a side-wall portion 6. To make the tire a pneumatic container without the use of an inner tube, a liner portion 7 of butyl-type rubber is adhered across the open belly of the tire from bead to bead.

To adhere the liner 7 to the tire casing in view of the present invention, an intermediate layer 8 comprised of GRS loaded with silica is inserted between the casing and the liner and adhered to both these portions by vulcanization. Whereas the prior art butyl-type rubber liner would easily separate from the belly of the tire casing during operation of the tire because of the poor adhesion of butyl-type rubber to GRS, the present invention through the use of the ply 8 provides satisfactory adhesion to make the liner 7 an integral part of the tire.

The GRS layer may be applied to the unvulcanized layers of the article to be vulcanized as a solvent adhesive. To do this, a stock of the formulation such as those shown in Example I is dissolved in a rubber solvent such as gasoline, toluene, xylene or the like until a total solids concentration of about 10% by weight is obtained.

Referring to the drawing, the ply 8 may be applied as an adhesive solution as described above. When applied as an adhesive, the belly of the unvulcanized tire band is coated with the adhesive solution and allowed to stand until the solvent portion of the adhesive evaporates leaving a tacky surface. The unvulcanized sheet of chlorinated butyl-type rubber next is applied to the tacky surface and pressed into intimate face to face contact with the surface, care being taken to prevent trapping of air between the butyl-type rubber sheet and the tire band. The tire is shaped and vulcanized with heat and pressure in a conventional manner with the result that the butyl-type rubber layer 7 is firmly adhered to the tire casing.

Those skilled in the art will be able to select compounding pigments such as vulcanizing agents, antioxidants, softeners, reinforcing agents and the like to arrive at desired physical properties for the vulcanized compounds of the invention.

Although several forms have been illustrated by way of example, it will be apparent to those skilled in the art that modifications may be made in the invention within the scope of the following claims.

We claim:
1. In a pneumatic tire of the tubeless variety an air impervious liner extending across and adhered to the open bellied portion thereof from bead to bead, said liner comprised of a chlorinated copolymer of isobutylene and an open chain conjugated diolefin, and a layer of a vulcanized rubbery copolymer of butadiene and styrene, containing not less than 20 parts of hydrated silica by weight based on 100 parts by weight of rubbery copolymer of butadiene and styrene adhered intermediate between and directly to one surface of said liner and to the adjacent rubbery portions of the tire.

2. A pneumatic tire according to claim 1 wherein the last mentioned layer contains from 20 to 90 parts hydrated silica by weight based on 100 parts by weight of copolymer present.

3. A pneumatic tire according to claim 1 wherein the last mentioned layer contains from 30 to 60 parts hydrated silica by weight based on 100 parts by weight of copolymer present.

References Cited in the file of this patent

UNITED STATES PATENTS

| | | |
|---|---|---|
| 2,442,083 | Hall et al. | May 25, 1948 |
| 2,467,322 | Lightbown et al. | Apr. 12, 1949 |
| 2,498,653 | Daly | Feb. 28, 1950 |
| 2,583,387 | Morrissey et al. | Jan. 22, 1952 |
| 2,668,789 | Phreaner | Feb. 9, 1954 |
| 2,698,041 | Morrissey et al. | Dec. 28, 1954 |
| 2,698,042 | Perkins | Dec. 28, 1954 |
| 2,760,894 | Wolf | Aug. 28, 1956 |
| 2,788,839 | Kindle et al. | Apr. 16, 1957 |
| 2,804,448 | Hallenbeck | Aug. 27, 1957 |
| 2,824,038 | Wilson et al. | Feb. 18, 1958 |
| 2,825,382 | Peterson et al. | Mar. 4, 1958 |
| 2,825,675 | Wilson et al. | Mar. 4, 1958 |
| 2,874,743 | Rowe | Feb. 24, 1959 |
| 2,891,595 | Kuntz, et al. | June 23, 1959 |
| 2,944,578 | Baldwin et al. | July 12, 1960 |